United States Patent Office 3,463,526
Patented Aug. 26, 1969

3,463,526
WELDABLE ATTACHMENTS FOR BONDED SANDWICH PANEL STRUCTURES
John J. Benincasa, Ellington, and Marvin L. Hage, Avon, Conn., assignors to United Aircraft Corporation, East Hartford, Conn., a corporation of Delaware
Filed Sept. 25, 1967, Ser. No. 670,357
Int. Cl. F16b 1/00; E04b 2/36
U.S. Cl. 287—189.36                                 3 Claims

ABSTRACT OF THE DISCLOSURE

A weldable attachment having heat sink properties that enable heat sensitive honeycomb sandwich panels to be joined together without damage to their adhesive bonded surfaces. The internally cored attachment is mechanically fastened to the honeycomb sandwich panel through thin protruding flanges that have a greater resistance to heat flow from the weld on the attachment than the thicker ribs and cooling fins surrounding the internal core.

BACKGROUND OF THE INVENTION

Field of invention

This invention relates to a weldment usable with standard welding techniques and more particularly to a weldment having heat sink properties for joining heat-sensitive, adhesive-bonded, sandwich panels.

Description of the prior art

In the construction business in general, and particularly in the fabrication of marine and aircraft vehicles, it has become increasingly advantageous to form the hull or airframe of the vehicle from thin wall aluminum honeycomb panels. Panels of this type come in standard lengths and can be cut to any desired configuration.

One of the problems encountered in the marine and aircraft industry is the lack of a satisfactory method of joining these heat-sensitive panels. Riveting the panels together, or joining them by means of conventional bolts and nuts, is expensive and time consuming because of the drilling involved and associated alignment problems. Heat from any of the standard welding techniques deforms the metal surface of the panel and does excessive damage to the honeycomb structure therebetween. Some of these sandwich panels have adhesive bonded aluminum face plates that are easily warped and their bond destroyed by excess heat. Therefore, some means must be employed to prevent the heat associated with the welding process from reaching these thin, heat sensitive panels if the speed and low cost of the welding technique is to be utilized in joining panels of this type.

One of the welded structures for joining sandwich-type steel panels employs a spar which is placed perpendicularly between two honeycomb face sheets. A channel member that has been initially welded along each side of the spar is welded to ears projecting from and running along the surface of the panel, thereby forming a structure of two parallel honeycomb panels with a spar therebetween. The ends of the spar have a plurality of tapered projections which extend past the edges of the steel panels. A closure member is placed along the edges of the panels and perpendicular thereto, with the tapered projections on the spar extending therethrough. The closure member is thereafter welded to the end of the tapered projections. A construction of this type is shown in United States Patent No. 3,282,615. One of the disadvantages of this particular fabrication technique is that the spar and panel work-piece sections are substantially in perpendicular relationship and, therefore, coplanar panel attachment is not feasible with this kind of construction.

Another method of joining heat sensitive honeycomb panels is shown in the patent to F. J. Kandra, United States Patent No. 3,024,879. Kandra utilizes a copper sheet as a heat sink that is placed external to, and in contact with, the outer surface of the honeycomb panel, except at the welding zone. The honeycomb panels (skin sheets) to be joined are brought together against a joint sheet held perpendicular thereto. The joint sheet has an ear which extends past the skin sheet. This projection ear is melted down to the surface of the skin sheet to form a joint between the skin sheet and the joint sheet with a fillet of fused metal. In this type of construction, it is necessary to weld the joint sheet directly to the panel skin sheets resulting in possible damage to the honeycomb panels.

In both of the above-welded structures for joining heat-sensitive honeycomb panels, there is no provision for a liquid coolant to be run through the weldment to provide additional heat dissipation during the welding process. The welding techniques employed heretofore relate only to braised or spot welded cores and have not been used with adhesive bonded cores.

SUMMARY OF INVENTION

An object of the invention is to provide a weldable attachment for joining heat-sensitive, adhesive-bonded panels, utilizing the heat-sink properties of the attachment to prevent excessive heat created during the welding process from reaching the adhesive bonded face plates and core of the honeycomb structure.

In accordance with one aspect of the present invention, a weldable attachment is provided that comprises an extruded internally cored metal attachment that functions as a heat sink and is mechanically or adhesively fastened along the edge of a panel by means of thin protruding attaching flanges that comprise the sides of a channel on the weldment. These attaching flanges have a greater resistance to heat flow than the thicker cooling ribs and fins surrounding the internal coring. Two or more panel sections can be easily joined at any desired angle by welding together the welding flanges on the attachments. If desired, several spar-like attachments can be located at spaced intervals between the panels or a single extruded attachment can be employed that fastens along the length of the panels. When a single weldable attachment is employed, a liquid coolant can be passed through the internal coring of the attachment to further aid in preventing heat from the welding process from reaching the adhesively bonded face plates and core.

The invention accordingly provides a weldable attachment that can be utilized to join together two or more heat-sensitive, honeycomb panels in a variety of configurations without the problems of alignment and close tolerances associated with purely mechanical fabrication techniques.

The foregoing and other objects, features and advantages of the present invention will become more apparent in the light of the following detailed description of preferred embodiments thereof as illustrated in the accompanying drawings.

DESCRIPTION OF THE PREFERRED EMBODIMENT

Figure 1:
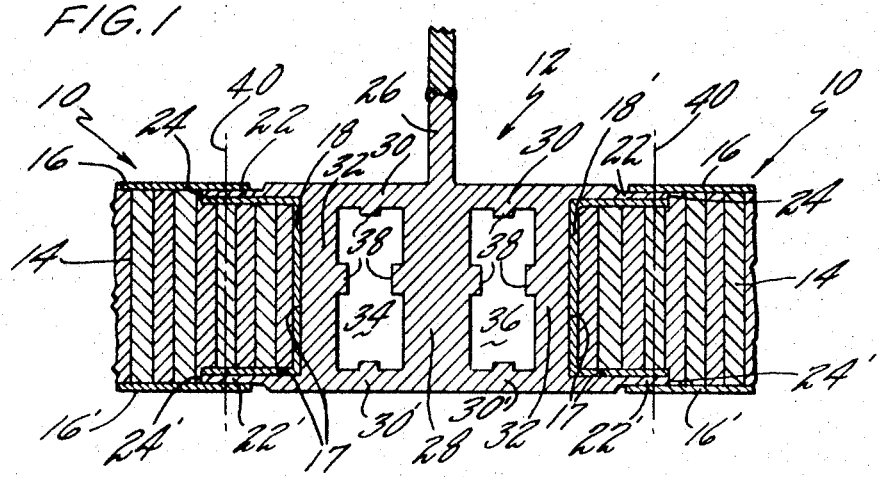
FIGURE 1 is a sectional view of a preferred embodiment of the invention and shows the weldable attachment connected between two coplanar honeycomb panels.

Referring generally to the embodiment of FIGURE 1, two coplanar sections of honeycomb panel 10 and 10' are joined together by a weldable attachment 12. Panel sections 10 and 10' comprise an aluminum core 14, sandwiched between a pair of aluminum face plates 16 and 16'. Of course, practically any material can be used for the face plates and core, e.g., plastic or fiber glass. These face plates are generally attached to the honeycomb core 14 by an adhesive bond that is very susceptible to damage by heat. Panel closure members 18 and 18' are utilized to seal the ends of the panel sections 10 and 10' and also function as a support for the weldable attachment 12. The weldable attachment 12 has a pair of oppositely opposed channels 17 and 17'. The sides of each of these channels comprise a pair of thin attaching flanges 22 and 22' that slide into slots 24 and 24' located between the honeycomb core 14 and each face plate 16, 16', thereby forming a smooth continuous joint on the outer surface of the assembly.

The attaching flanges 22 and 22' can just as easily be designed to slide over the outer surfaces of each face plate 16, 16' so that the entire honeycomb section is positioned therebetween.

The weldable attachment 12 has a major heat-sink in the shape of a web 28 located at its center. A weldable flange 26 projects from one end of the central web 28. The remainder of attachment 12 comprises ribs 30, 30' extending perpendicularly from, and on each side of the heat-sink 28. A web-like member 32 connects ribs 30, 30' thereby forming two symmetrical internal cores 34 and 36, each of which is surrounded by ribs 30, 30' and web 32. Additional cooling is provided by a number of cooling fins 38 that project inwardly from the walls of the cores 34, 36. To provide still further cooling, a liquid or gas can be passed through the cores.

The attachment 12, shown in FIGURE 1, is utilized to join two panels in coplanar relationship by making the necessary mechanical connection at points 40. A third member, such as a partition or other framework to hold equipment, can be welded directly to the weldable process flows into the major heat-sink 28 and circulates around the path formed by ribs 30, 30' and webs 32. Ribs 30, 30' and webs 32 are designed to have a greater resistance to the flow of heat (their cross-sectional area is much less than the cross-sectional area of major heat-sink 28) than web 28, and, therefore, web 28 receives the bulk of the heat from the welding process. The attaching flanges 22 and 22' have smaller cross-sectional areas than ribs 30, 30' and webs 32, therefore, the flow of heat reaching these attaching flanges is greatly inhibited. With a liquid coolant circulating through the cores 34 and 36 during the welding process, thin attaching flanges 22, 22' remain relatively cool.

That is, the heat flow in the attachment 12 is closely analogous to loop current flow in a simple electronic circuit. Cores 34 and 36 form two loops with the heat circulating in the external ribs and webs located therearound. Practically all of the heat flowing into the cooling fins 38 is dissipated either into a liquid coolant or into the air.

Figure 2:
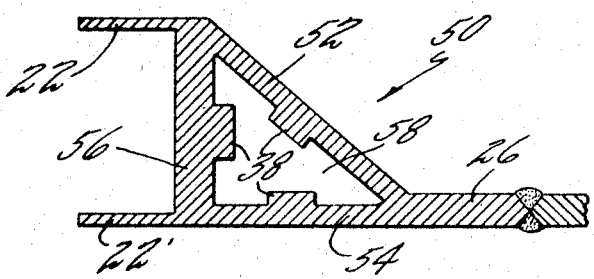
FIGURE 2 is a sectional view of a triangular shaped attachment typical of the many geometric shapes that can be used to join honeycomb panels in coplanar or other relationships.

FIGURE 2 illustrates one of many possible geometric shapes that can be utilized to join a pair of honeycomb panels in coplanar relationship. A weldable attachment 50 is attached by mechanical or adhesive means to each of the panels as previously discussed hereinbefore in connection with FIGURE 1. Following this step, the two panels can be easily and quickly joined by welding together the weldable flanges 26 on each attachment 50. Heat from the welding process circulates around the loop formed by ribs 52, 54 and web 56, with most of the heat being dissipated by the cooling fins 38 extending into core 58 as discussed hereinbefore in FIGURE 1.

Figure 3:
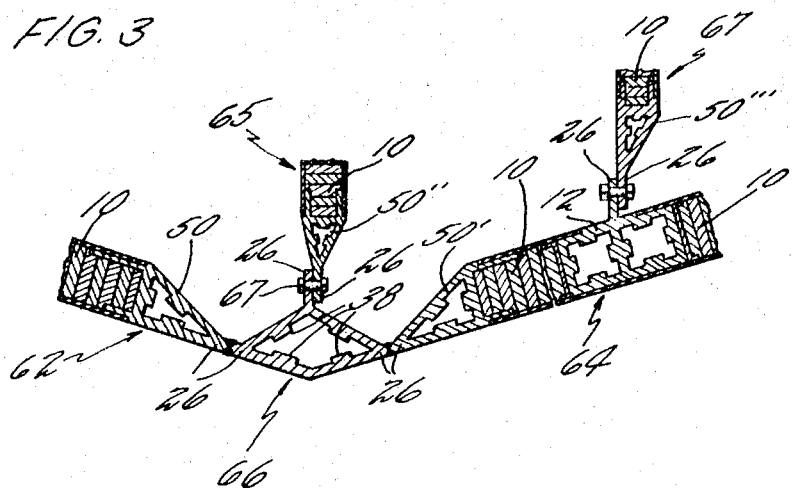
FIGURE 3 is a sectional view of a boat hull and illustrates the connection of portions of the hull sides to the boat's keel using the weldable attachment of this invention.

FIGURE 3 is illustrative of the many different panel configurations that can be formed with the weldable attachment of this invention, and also the extensive choice of geometric shapes available for the attachments. Weldable members 50, 50" and 50''' are of the same geometric shape.

In FIGURE 3, panel sections 62 and 64 are portions of the bottom of a boat's hull. Each of the hull sections 62, 64 comprise a section of honeycomb panel 10 mechanically fastened to their respective weldable attachments 50 and 50' in the manner shown heretofore in FIGURE 1. Also incorporated into hull section 64 is an attachment 12. In addition to the configurations illustrated in FIGURES 1 and 2, hull section 64 has a partition 67 bolted to flange 26 on attachment 12. Partition 67 comprises attachment 50''' and its associated honeycomb panel 10. The keel 66 of the boat is formed from a single extruded member and the provision of cooling fins 38 is optional. To connect the bottom hull sections 62 and 64 to the keel 66, the weldable flanges 26 on attachments 50 and 50' are welded to the keel 66, thereby forming a completed V-shaped hull. Panel section 65 is a vertical partition inside the boat's hull similar to section 62, and can be either welded or bolted to the keel 66 at points 67.

Figure 4:
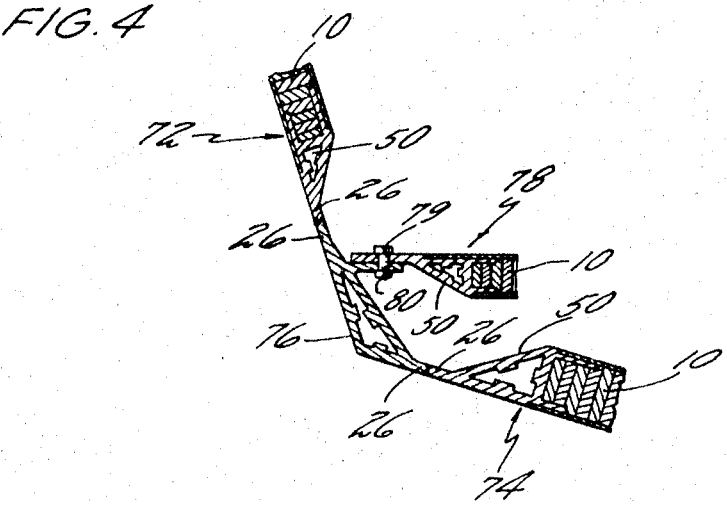
FIGURE 4 is a sectional view of one side of a boat's hull and shows a portion of the side and bottom of the hull attached by the weldable member.

FIGURE 4 is similar to FIGURE 3 and illustrates a portion of a side section 72 and a portion of a bottom section 74 of a boat's hull attached by a weldable attachment and junction member 76. Side section 72 and bottom section 74 each comprise a honeycomb panel assembly 10 and a weldable attachment 50, mechanically fastened together. Weldable attachment 76 is of the type discussed hereinbefore and has a weldable flange 26 on each end thereof. The geometric shape of this weldment is typical of the unlimited possibilities in boat-hull design. Fabrication of the hull's side and bottom sections is completed by welding together all the weldable flanges 26, thereby forming a single integral unit. Partition 78 comprises a honeycomb panel section 10 and an attachment 50, and represents only one of many compartment configurations that might appear inside a hull of this type. The partition section 78 is mechanically attached to junction member 76 by a bolt and nut 79, 80, further illustrating the versatility of this type of boat fabrication.

Figure 5:
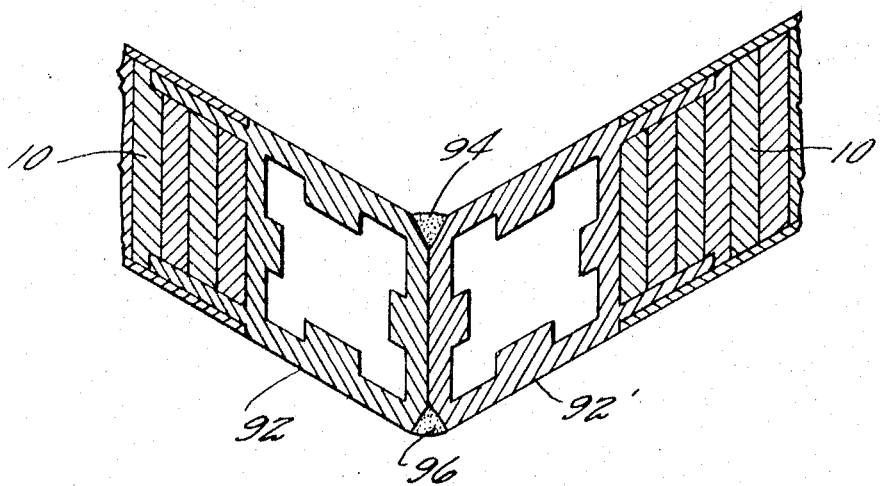
FIGURE 5 is a sectional view of an alternate embodiment illustrating a portion of a boat hull comprising two honeycomb panel sections joined at the keel by means of a V-shaped weldable attachment.

The weldable attachments 92 and 92', illustrated in FIGURE 5, are an alternate geometric configuration and are indicative of still another geometric shape. In FIGURE 5, the two attachments 92, 92', with their connected panel sections 10, are welded together at points 94 and 96 to form a V-shaped boat hull.

Although the invention has been shown and described with respect to preferred embodiments thereof, it should be understood by those skilled in the art that the foregoing and other changes and omissions in the form and detail thereof may be made therein without departing from the spirit and scope of the invention, which is to be limited and defined only as set forth in the following claims.

Having thus described typical embodiments of the invention, that which is claimed as new and to be secured by Letters Patent of the United States is:

1. A welded joint including:
 (a) A honey comb sandwich panel member having:
  (1) a honeycomb core
  (2) face plates attached to the opposite sides of the honeycomb core, (b) An attachment member having:
  (1) a main body extending along said honeycomb panel member and having:
    (A) wall members shaped to define a coolant flow channel therewithin,
  (2) at least one attaching flange extending from said main body and connected to said panel member and having a selected heat flow capacity,
  (3) a welding flange projecting therefrom at a location remote from said attaching flange and adapted to be welded to a third member so as to join the honeycomb panel to the third member and,
  (4) wherein said wall members include a wall section having substantially greater heat flow capacity than said attaching flange and positioned adjacent said coolant channel intermediate said attaching flange and said welding flange so that the heat generated by welding said welding flange to said third member will flow into said wall section and then into said coolant channel so as to reduce heat transfer to said attaching flange and said honeycomb panel.

2. Apparatus according to claim 1 and including at least one fin member projecting from said wall members into said cooling channel.

3. A welded joint including:
  (a) A first honeycomb sandwich panel member having:
    (1) a honeycomb core,
    (2) face plates attached to the opposite sides of the honeycomb core.
  (b) A second honeycomb sandwich panel member having:
    (1) a honeycomb core,
    (2) face plates attached to the opposite sides of the honeycomb core,
  (c) Attachment means positioned between said first and second panel members and having:
    (1) a main body extending along said honeycomb panel members and having:
      (A) wall means shaped to define a coolant flow channel therewithin,
    (2) at least one pair of attaching flanges extending from said main body and connected to said first panel member and having a selected flow capacity,
    (3) a second pair of attaching flanges extending from said main body and connected to said second panel member and having a selected heat flow capacity,
    (4) a welding flange projecting from said main body at a location remote from said attaching flange pairs and attached thereto for welding to a third member so as to join the honeycomb panels to one another and to said third member and,
    (5) wherein said wall members include a wall section having substantially greater heat flow capacity than said attaching flange pair and positioned intermediate said attaching flange pairs and said welding flange and adjacent said coolant channel so that the heat generated by welding said welding flange to said third member will flow into said wall section and then into said coolant channel so as to reduce heat transfer to said attaching flange pairs and said honeycomb panels.

References Cited

UNITED STATES PATENTS

| | | | |
|---|---|---|---|
| 2,107,435 | 2/1938 | Birmingham | 219—137 |
| 3,412,457 | 11/1968 | Gregory | 29—487 |
| 2,918,708 | 12/1959 | Sharp | 52—627 |

JOHN E. MURTAGH, Primary Examiner

U.S. Cl. X.R.

29—487; 52—282, 582, 620, 624